United States Patent [19]
Hansen

[11] 3,866,688
[45] Feb. 18, 1975

[54] FIELD CULTIVATOR WING LIFT
[75] Inventor: Loren F. Hansen, Ankeny, Iowa
[73] Assignee: Koehring Company, Milwaukee, Wis.
[22] Filed: Dec. 13, 1972
[21] Appl. No.: 314,679

[52] U.S. Cl............................ 172/311, 172/456
[51] Int. Cl............................................ A01b 63/00
[58] Field of Search .......... 172/310, 311, 456, 667, 172/776; 280/411 A, 411 R, 412, 413

[56] References Cited
UNITED STATES PATENTS

| | | | |
|---|---|---|---|
| 3,376,050 | 4/1968 | Lohrman | 172/311 X |
| 3,401,752 | 9/1968 | Nja | 172/456 X |
| 3,568,777 | 3/1971 | Hook | 172/311 X |
| 3,650,333 | 3/1972 | Fueslein | 172/311 |

Primary Examiner—Robert E. Bagwill
Assistant Examiner—Paul T. Sewell
Attorney, Agent, or Firm—Finnegan, Henderson, Farabow & Garrett

[57] ABSTRACT

An agricultural implement, such as a field cultivator comprising at least two frame sections pivotally connected together in a side-by-side relationship. One frame section may be pivoted relative to the other frame section between a working position substantially in horizontal alignment with the other frame section and a transport position obliquely over the other frame section. Power means is provided for connecting the frame sections; the power means includes means for moving one of the frame sections from the working position to the transport position, and means for moving a frame section from the transport position to the working position.

7 Claims, 5 Drawing Figures

FIELD CULTIVATOR WING LIFT

FIELD OF THE INVENTION

The present invention relates generally to the field of farm implements, and more particularly, to agricultural implements, such as field cultivators of such size that they are normally difficult to transport. The improved implement of the present invention includes a plurality of sectional frame components in which at least one end or outrigger section is pivotally connected in a side-by-side relationship with another frame section. The outrigger section is movable between a working position in horizontal alignment with the other frame section and a transport position in which the outrigger section is obliquely over the other frame section.

BACKGROUND OF THE INVENTION

Due to increasing horsepower of tractors in common use, certain types of agricultural implements such as field cultivators, of great width have become practical. Present day tractors are capable of propelling such implements and can thereby cover very broad paths with each traverse of a field. However, agricultural implements of great width are difficult to transport. Because of their great width, such implements often cannot be accomodated on public roads, particularly roads with two-way traffic. Access lanes and roads within a farm may be narrowed at gate areas by the nature of the terrain, by trees, by fencing, etc. to such an extent that they will not accomodate implements of a width practical for field use. In addition, farm implements of great width require a great deal of storage area.

To alleviate transportation and storage problems presented by agricultural implements of great width, it has become increasingly common to design such implements as a series of frame sections pivotally secured together. In such implements, outrigger or wing sections can be folded from the normal horizontal working position into a raised transport position to thereby reduce the width of the implement.

Some such implements provide no system for powering wing frame folding. Folding is done manually by lifting or lowering. Such an arrangement is obviously not satisfactory in all cases. Manually moving the wing sections may take too much time or the weight of the wing frames may be too great to conveniently be handled manually.

Other implements provide a system for powering wing frame folding. In many of such implements, power means are provided for moving the wing sections from their horizontal working positions into a vertical transport position. For transport, it is necessary to lock each wing in the vertical position, as by insertion of a locking pin. If the wings are not locked in the vertical position, they may fall toward the horizontal position in the event that a hydraulic hose fails or the hydraulic cylinder is accidentally actuated.

If the wings of such implements are folded past vertical to a position obliquely over the central frame, there is no need to lock them upward. Means can be provided to support the wings by force of gravity in such a position. However, presently available implements provided with a system for power folding into such a position do not provide power means for returning the end frames back to the horizontal working position. With such implements, after transport, it is necessary to manually raise the wings to the vertical position before they can be returned to the horizontal position. This is disadvantageous since it requires that the operator get off the tractor and manually raise what may be a very heavy frame section.

The present invention provides an agricultural implement having a plurality of frame sections, at least one of which is foldable, coupled with power means capable of moving a foldable frame section and a transport position obliquely over the other frame section to from the transport position back to the work position. It is not necessary to lock the foldable frame section in a transport position or to manually move the foldable frame section out of, or into the transport position.

SUMMARY OF THE INVENTION

The present invention is directed to an agricultural implement such as a field cultivator or the like, comprising at least two frame sections. Pivot means are provided connecting the frame sections together in a side-by-side relationship. The pivot means provide for movement of one of the frame sections relative to the other frame section between a working position substantially in horizontal alignment with the other frame section, and a transport position obliquely over the other frame section. Power means is connected between the frame sections; the power means includes means for moving one of the frame sections from the working position to the transport position, and means for moving a frame section from the transport position to the working position.

Preferably, the power means comprises a hydraulic cylinder mounted on one of the frames operably connected to the other frame section by linkage means. The linkage means provide for pivoting one of the frame sections from the working position to the transport position and from the transport position to the working position upon actuation of the cylinder.

In addition, the agricultural implement additionally preferably includes a central frame and a pair of wing frames connected to either side of the central frame in a side-by-side relationship. Pivot means connect each of the wing frames to the central frame permitting movement of the wing frames relative to the central frames between a working position substantially in horizontal alignment with the central frame and a transport position obliquely over the central frame. Power means are connected between the central frame and the wing frames; the power means includes means for moving the wing frames from the working position to the transport position, and means for moving said wing frames from the transport position to the working position.

BRIEF DESCRIPTION OF THE DRAWINGS:

In FIG. 4, the wing frame is in the transport position and in position to be returned to the working position.

DESCRIPTION OF THE PREFERRED EMBODIMENTS:

The agricultural implements of the present invention include at least two frame sections and pivot means connecting the frame sections together in a side-by-side relationship. In accordance with a preferred embodiment of the present invention, the agricultural implement includes a central frame, a pair of wing frames, and pivot means connecting each of the wing frames to the central frame in a side-by-side relationship.

Figure 1:
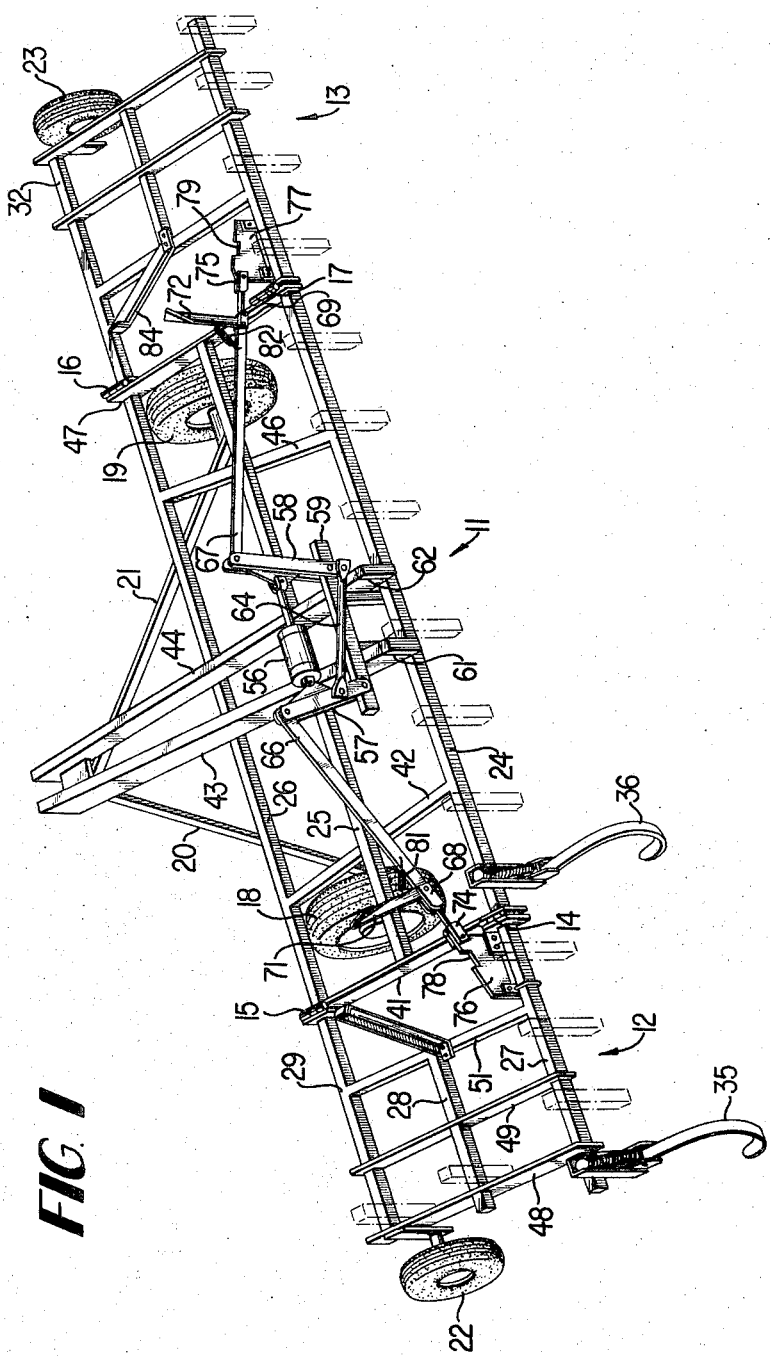
FIG. 1 is a perspective view of a multi-sectional agricultural implement embodying the principles of the present invention.
Figure 2:
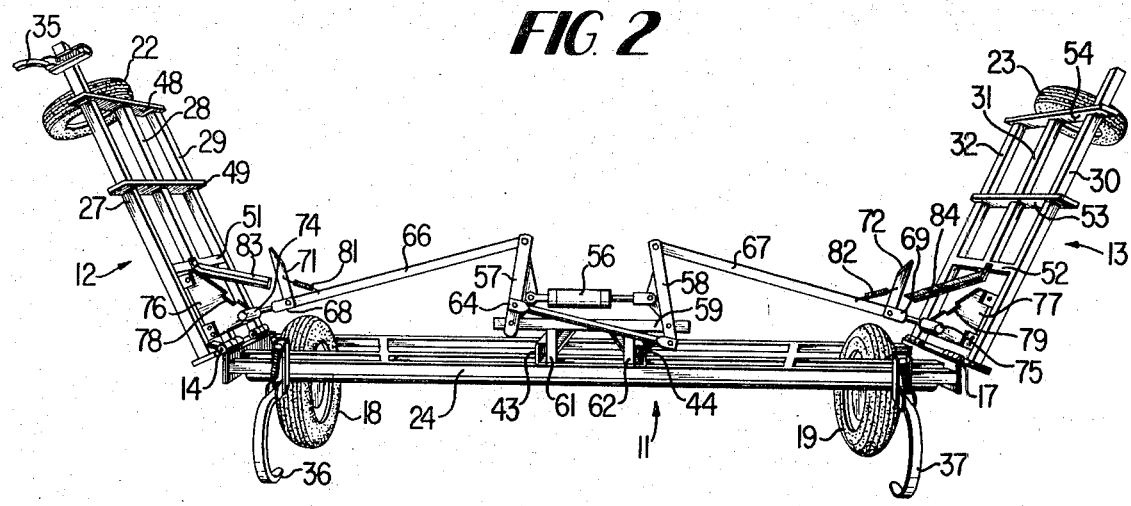
FIG. 2 is a rear elevational view of the multi-sectional agricultural implement of FIG. 1 showing the wing frames partially raised from the working position towards the transport position.
Figure 3:
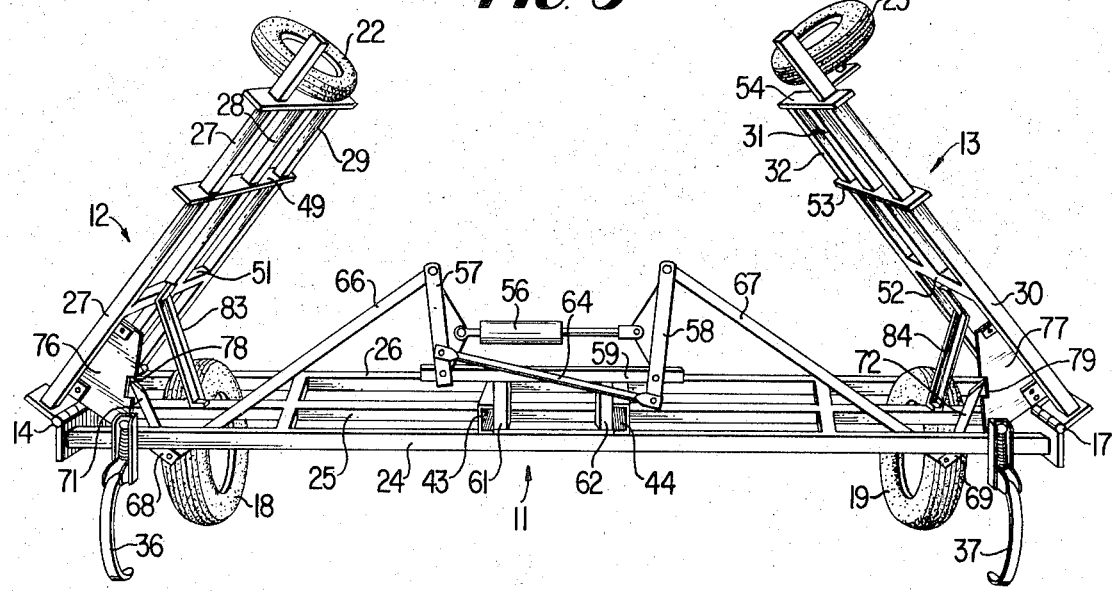
FIG. 3 is a rear elevational view of the multi-sectional agricultural implement of FIG. 1, showing the wing frames pivoted past the vertical position, and approximating the transport position.

In the embodiment of FIGS. 1–3, the implement comprises a central frame, generally 11, and a pair of outriggers or wing frames, generally 12 and 13. Wing frames 12 and 13 are connected to and extend traversely from the ends of central frame 11. Central frame 11 is supported on ground-engaging wheels 18 and 19 secured to central frame 11 by conventional means well known in the art. Central frame 11 is also provided with a pair of draft members 20 and 21 which converge forwardly to an apex where they are provided with a conventional hitch member (not shown) suitable for attachment to a propelling vehicle.

In the embodiment shown in the drawings, central frame 11 is supported on ground-engaging wheels 18 and 19, secured to central frame 11 by conventional means well known in the art. In another embodiment of the present invention (not shown) central frame 11 may be directly mounted on and carried by a tractor, as through the use of a conventional three-point hitch. Additionally, as here embodied, wings 12 and 13 are equipped with gauge wheels 22 and 23. It will be appreciated that while such gauge wheels are not required, they provide added stability, particularly to large units.

In the embodiment illustrated in FIGS. 1–3, central frame 11 comprises a plurality of longitudinally extending traverse members 24, 25, and 26, which are connected to a plurality of cross members 41, 42, 43, 44, 46, and 47. Wing frames 12 and 13 also comprise a plurality of longitudinally extending traverse members, respectively 27, 28, 29 and 30, 31, 32, connected to a plurality of cross members, respectively 48, 49, 51 and 52, 53, 54. Normally, in use, traverse frame members 24–32 will each carry a plurality of earth working tools mounted on the frame members by means conventionally used for such purposes in the field of agricultural implements. For simplicity, the earth working tools normally attached to the frame members are omitted from the drawings except for a limited showing of several tools in each of FIGS. 1–3 to illustrate a suitable arrangement of parts. Exemplary of several earth working tools are chisel type shanks 35, 36 and 37. Other suitable earth working tools may include spring teeth, spike teeth, various types of chisels, V-plows or blades, disks, and rotary hoes.

In accordance with the present invention, the pivot means connecting the frame sections together in a side-by-side relationship provides for movement of at least one frame section relative to another frame section between a working position substantially in horizontal alignment with the other frame section and a transport position obliquely over the other frame section. In accordance with a preferred embodiment of the present invention, such a pivot means connects each of a pair of wing frames to a central frame.

In the embodiment of FIGS. 1–3, wing frame 12 is pivotally secured to central frame 11 by hinges 14 and 15, while wing frame 13 is pivotally secured to central frame 11 by hinges 16 and 17. Hinges 14 through 17 permit movement of wing frames 12 and 13 from the horizontal work position shown in FIG. 1 through a partially raised position shown in FIG. 2 to a transport position approximated by FIG. 3.

In accordance with the present invention, the agricultural implement is provided with power means connected between the frame sections. The power means includes means for moving one of the frame sections from the working position to the transport position, and means for moving the frame section from the transport position to the working position. Preferably, the power means comprises a hydraulic cylinder mounted on one of the frames operably connected to the other frame section by linkage means. In accordance with a further preferred embodiment of the present invention, the hydraulic cylinder power means is mounted on a central frame and operably connected to each of a pair of wing frames by linkage means. The linkage provides means for pivoting at least one frame section, and preferably both wing frames, from the working position to the transport position and means for pivoting at least one frame section, and preferably both wing frames, from the transport position to the working position, upon actuation of the hydraulic cylinder.

In one preferred embodiment of the present invention, the linkage means comprises a pair of upwardly extending arms spaced longitudinally on, and pivotally connected at the lower ends, to a central frame. The arms are also pivotally connected to the hydraulic cylinder, and a tie rod is pivotally connected to the lower portion of the arms. A pair of connectors are provided, one of which connects one of the upwardly extending arms with a first wing frame and the other of which connects the other of the arms with a second wing frame. Each of the connectors comprises an elongated rigid member pivotally connected at one end to an upwardly extending arm. The other end of the elongated rigid member is pivotally connected to a rigid linking member which is pivotally connected to a wing frame. A latch is pivotally connected to either the elongated rigid member or the rigid linking member. Notch means are provided on the wing frames for engaging the latch when the link frame is in the transport position.

In the embodiment shown in the drawings, the power means connected between the frame sections includes an extensible and retractable double-acting hydraulic cylinder 56 located above and in longitudinal alignment with central frame 11. Hydraulic cylinder 56 is interconnected with a conventional fluid pressure source and a fluid reservoir (not shown) on the propelling vehicle so that the cylinder may be extended and retracted by operation of conventional hydraluic controls provided on the propelling vehicle.

As here embodied, cylinder 56 is pivotally mounted between a pair of upstanding support arms 57 and 58. Support arms 57 and 58 are spaced longitudinally on and pivotally connected to central frame 11. In the preferred embodiment of FIGS. 1–3, support arms 57 and 58 are pivotally mounted on laterally extending cylinder support means 59 which member is rigidly attached to central frame 11 by attaching members 61 and 62. Attaching members 61 and 62 may be mounted on traverse frame 24 by conventional means such as welding or through the use of a U-bolt. Support arms 57 and 58 are pivotally connected near their lower ends, by tie rod 64. At their upper ends, support arms 57 and 58 are connected to the wing frames.

In the present embodiment, the support arms 57 and 58 are pivotally connected to one end of elongated rigid members such as radius bars 66 and 67. At their opposite ends, radius bars 66 and 67 are each pivotally connected to rigid linking member which is pivotally connected to a wing frame. In the specific embodiment of the drawings, and as best shown (in part) in the detail of FIGS. 4 and 5, radius bars 66 and 67 are pivotally attached, respectively, to clevi 68 and 69. Clevi 68 and 69 are respectively attached to clevi 74 and 75 which are in turn, respectively pivotally attached to upstanding brackets or mast plates 76 and 77. Mast plates 76 and 77 are attached to wing frames 12 and 13 by conventional means, such as bolting or welding to traverse wing frame members 27 and 30.

In accordance with one embodiment of the present invention, latch members 71 and 72 are pivotally connected to either the elongated rigid member or the rigid linking member. In the embodiment shown in the drawings, and in particular FIGS. 4 and 5, latch member 71 is pivotally attached at the radius bar 66-clevis 68 connection. Similarly, latch 72 is pivotally attached at the radius bar 67-clevis 69 connection.

The upper ends of the latch members are adapted to be received in a notch in the wing frame when the wing frame is in a transport position. As here embodied, and best shown in FIG. 4, the upper end of latch 71 may be engaged in notch 78 in mast plate 76 when wing 12 is in the transport position. Similarly, the upper end of latch 72 may be engaged in notch 79 of mast plate 77 when wing member 13 is in the transport position. Latches 76 and 88 are urged to a disengaged position by tension springs 81 and 82.

Preferably, the agricultural implement of the present invention includes means for supporting a frame in the transport position. In the embodiment shown in the drawings, wings 12 and 13 are provided with upstanding support members 83 and 84 attached respectively to traverse members 28 and 31. When the wings are in the traverse position, support members 83 and 84 mate against traverse member 25 of central frame 11 thereby supporting wings 12 and 13 by the force of gravity, in the transport position.

In operation, a frame section of the agricultural implement of the present invention may be moved from a working position substantially in horizontal alignment with another frame section to a transport position obliquely over the other frame section, and from the transport position back to the working position. In the embodiment shown in the drawings, wings 12 and 13 are moved from the working position shown in FIG. 1 by retracting hydraulic cylinder 56 which causes support arms 57 and 58 to move toward each other. Since pivotally mounted support arms 57 and 58 are connected by tie rod 64, support arms 57 and 58 move simultaneously. As support arms 57 and 58 are drawn together by retracting cylinder 56, pivotally mounted radius bars 66 and 67 transfer tension through the various clevi to mast plates 76 and 77. The tension transmitted to mast plates 76 and 77 causes wings 12 and 13 to pivot upwardly about the various hinges. Retraction of cylinder 56 is continued until wings 12 and 13 pass through the partially raised position shown in FIG. 2 and until wings 12 and 13 are slightly beyond perpendicular with respect to central frame 11. After wings 12 and 13 have passed perpendicular, cylinder 56 is expanded allowing gravity to pull wings 12 and 13 through the oblique position shown in FIG. 3 until the wings are resting on supports 83 and 84 (the transfer position).

Figure 4:
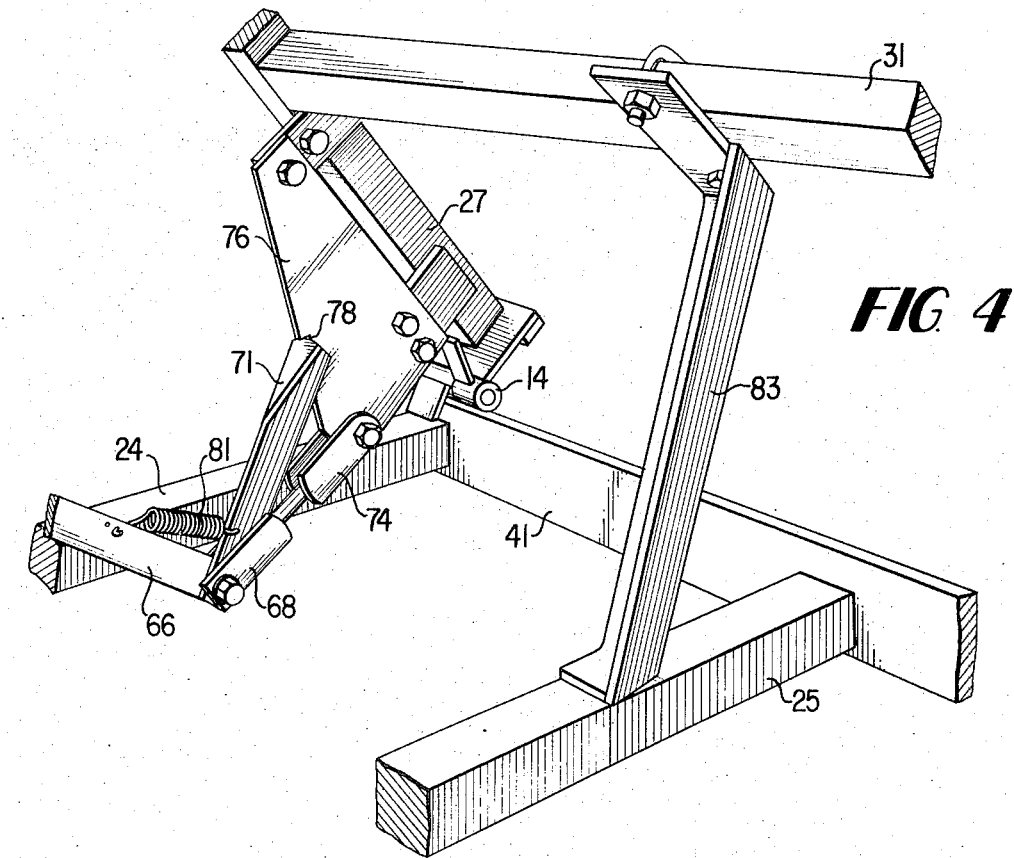
FIG. 4 is an enlarged partial perspective view showing the details of a preferred linkage between a foldable wing frame and another frame section.
Figure 5:
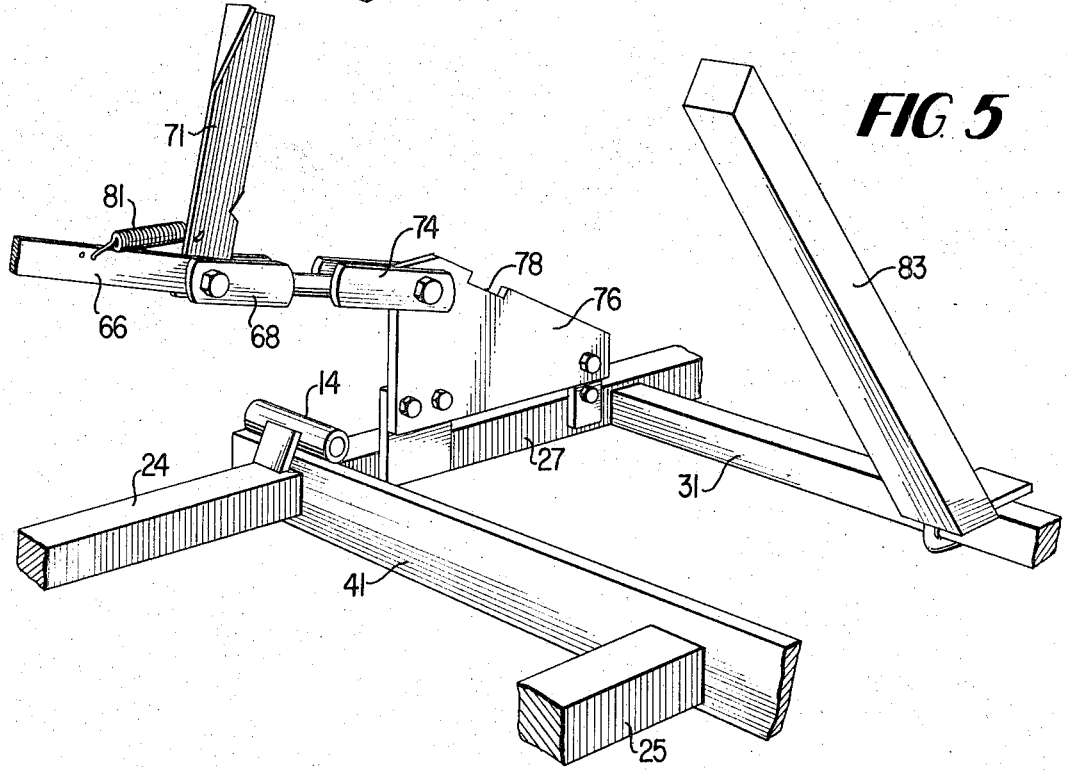
FIG. 5 is a view similar to FIG. 4 with the wing frame in the working position.

To return the wings to the working position, cylinder 56 is expanded until latches 71 and 72 are engaged in notches 78 and 79 of mast plates 76 and 77 (the position shown in the detail of FIG. 4). Cylinder 56 is then retracted; the resultant tension transmitted through radius bars 66 and 67 exerts an upward component of force in latches 71 and 72. The upward component of force is transmitted from latches 71 and 72 through mast plates 76 and 77 to wings 12 and 13, causing them to move upward towards the vertical position with respect to central frame 11. Retraction of the cylinder is continued until wings 12 and 13 have passed the vertical position at which time tension springs 81 and 82 retract latches 71 and 72 from the engaged position with respect to notches 78 and 79. Cylinder 56 is then expanded to lower wings 12 and 13 through the partially raised position shown in FIG. 2 to the ground level horizontal work position of FIG. 1.

The invention in its broader aspects is not limited to the specific details shown and described, and departure from such details may be made without departing from the principle of the invention and without sacrificing its principal advantages.

What is claimed is:

1. An agricultural implement comprising:
  A. a central frame;
  B. a pair of wing frames;
  C. pivot means connecting each of said wing frames to said central frame in side-by-side relationship for movement of said wing frames relative to said central frame between a working position substantially in horizontal alignment with said central frame, and a transport position obliquely over said central frame; and
  D. power means connected between said central frame and said wing frames including a single piston power source and a pair of linkage systems joined together for simultaneous movement for moving said wing frames from said working position to said transport position and for moving said wing frames from said transport position to said working position, said linkage systems comprising:
    1. a pair of upwardly extending arms spaced longitudinally on, and pivotally connected at their lower ends to, said central frame, said arms being pivotally connected to said piston power source;
    2. means interconnecting said arms for causing said arms to move simultaneously; and
    3. a pair of connectors, one of which connects one of said arms with one wing frame and the other of which connects the other of said arms with the other wing frame, each of said connectors comprising:
      a. an elongated rigid member pivotally connected at one end to one of said arms and pivotally connected at the other end to b. a rigid linking member pivotally connected to one of said wing frames, c. a latch pivotally connected to at least one of said elongated and linking rigid members, and d. means on said wing frame for engaging said latch when said wing frame is in the transport position.

2. An agricultural implement comprising:

A. at least first and second frame sections;

B. pivot means connecting said frame sections together in side-by-side relationship for movement of said first frame section relative to said second frame section between a transport position obliquely over said second frame section, through a vertical position and to a working position substantially in horizontal alignment with said second frame section; and C. reciprocating power means and a multibar linkage system connected between said first and second frame sections, said linkage system comprising:

1. first means including a rigid member mounted on one of said linkage system and said first frame and receiving means for releasably receiving said rigid member on the other of said linkage system and said first frame, said receiving means receiving said rigid member during movement of said first frame from said transport position toward said vertical position and said receiving means and said rigid member being disengaged as said first frame moves from said vertical position toward said working position, and 2. second means for moving said first frame section, said second means being operative during movement of said first frame from a position adjacent said vertical position to said working position.

3. An agricultural implement as defined in claim 2 wherein said rigid member is attached to said linkage system, and including means for disengaging said rigid member from said receiving means.

4. An agricultural implement comprising:

A. first and second frame sections longitudinally aligned and pivotally connected together;

B. pivot means connecting said first and second frame sections;

C. power means for moving said first frame section from 1. a working position wherein said first and second frame sections are substantially horizontally aligned to;

2. a transport position wherein said first frame section is obliquely oriented with respect to said second frame section and wherein the center of gravity of said first frame section is vertically aligned with a first portion of said second frame section;

D. power transmitting means drivingly connected to said power means and said first frame section and including a linkage system having at least a first link, a second link and a third link, said first link being pivotally connected at one end to said first frame section spaced from said pivot means and at the other end to one end of said second link, the other end of said second link being pivotally connected to one end of said third link, the other end of said third link being pivotally connected to a stationary support, and wherein said power means is connected to said third link, said power transmitting means being adapted to lift said first frame section from said working position to a position wherein the center of gravity of said first frame section is vertically aligned with a second portion of said second frame section, said second portion being closer to said pivot means than is said first portion, means for restraining the descent of said first frame section toward said transport position, and means operative during return movement of said first frame section from said transport position toward a substantially vertical position for effecting said return movement and said power transmitting means being adapted to lower said first frame section to said working position.

5. The agricultural implement of claim 4 wherein each of said first, second and third links are in tension during the movement of said frame section from said working position to said transport position and from said transport position to said working position.

6. An agricultural implement comprising:

A. first and second frame sections longitudinally aligned and pivotally connected together;

B. pivot means connecting said first and second frame sections;

C. power means for moving said first frame section from 1. a working position wherein said first frame sections are substantially horizontally aligned to;

2. a transport position wherein said first frame section is obliquely oriented with respect to said second frame section and wherein the center of gravity of said first frame section is vertically aligned with a first portion of said second frame section;

D. power transmitting means drivingly connected to said power means and said first frame section, said power transmitting means including means for lifting said first frame section from said working position to a position wherein the center of gravity of said first frame section is vertically aligned with the second portion of said second frame section, said second portion being closer to said pivot means than is said first portion, means for restraining the descent of said first frame section toward said transport position, a latch attached at one end to one of said power transmitting means and said first frame section, the other of said power transmitting means and said first frame section including receiving means for releasably receiving the other end of said latch, said latch engaging said receiving means for effecting movement of said first frame section from said transport position toward said substantially vertical position, said latch being disengaged from said receiving means during movement of said first frame section from said substantially vertical position toward said working position and means for lowering said first frame section to said working position.

7. An agricultural implement comprising:

A. at least two frame sections;

B. pivot means connecting said frame sections together in side-by-side relationship for movement of a first frame section relative to a second frame section between a working position substantially in horizontal alignment with said second frame section and a transport position obliquely over said second frame section;
C. power means connected to said first frame section including a reciprocating power source and a linkage system
  1. for moving said first frame section from said working position to said transport position, and
  2. for moving said first frame section from said transport position to said working position, and
D. a latch attached to one of said linkage system and said first frame section and receiving means for releasably receiving said latch, said receiving means being on the other of said linkage system and said first frame section, said latch engaging said receiving means for effecting movement of said first frame section from said transport position toward an interim position substantially midway between said transport and said working positions, said latch being disengaged from said receiving means during movement of said first frame section from said interim position toward said working position.

* * * * *